United States Patent

Konchan

(10) Patent No.: US 8,708,396 B2
(45) Date of Patent: Apr. 29, 2014

(54) GLASS INDEXING SYSTEM AND METHOD

(75) Inventor: Jeffrey L. Konchan, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 629 days.

(21) Appl. No.: 12/956,171

(22) Filed: Nov. 30, 2010

(65) Prior Publication Data

US 2012/0136532 A1 May 31, 2012

(51) Int. Cl.
*B60J 1/08* (2006.01)

(52) U.S. Cl.
USPC ........... 296/146.1; 340/5.72; 49/502; 49/358; 49/31; 49/506; 318/467; 180/286; 180/281

(58) Field of Classification Search
None
See application file for complete search history.

(56) References Cited

U.S. PATENT DOCUMENTS

| 8,390,266 | B2 * | 3/2013 | Franzan et al. | 324/71.1 |
| 2007/0158954 | A1 * | 7/2007 | Warmke et al. | 292/201 |
| 2008/0001412 | A1 * | 1/2008 | Nozawa et al. | 292/2 |
| 2009/0051192 | A1 * | 2/2009 | Ewing et al. | 296/146.2 |
| 2010/0007463 | A1 * | 1/2010 | Dingman et al. | 340/5.72 |
| 2011/0314737 | A1 * | 12/2011 | Schindhelm et al. | 49/31 |
| 2012/0133174 | A1 * | 5/2012 | Syvret et al. | 296/146.2 |
| 2012/0234621 | A1 * | 9/2012 | Syvret et al. | 180/281 |

FOREIGN PATENT DOCUMENTS

| DE | 19836761 C1 | 7/1999 |
| DE | 19848652 C1 | 3/2000 |
| DE | 10338767 A1 | 3/2005 |

\* cited by examiner

*Primary Examiner* — Helal A Algahaim
*Assistant Examiner* — Paul Castro
(74) *Attorney, Agent, or Firm* — Quinn Law Group, PLLC (57) ABSTRACT

A system and method is provided to index the door window glass of a vehicle to disengage the glass from the window sealing interface prior to opening the door. A door latch including an unlatching lever selectively connectable to the inside and outside door handles is configured such that moving either handle to actuate the latch causes an initial change in the position of the unlatching lever prior to latch release. A sensor in the latch detects the initial change in position of the unlatching lever and signals an indexing mechanism to move the glass to the indexed position prior to latch release, such that the glass does not substantially interfere with the sealing interface when the door is moved from a closed position. The system may be configured such that the door lock mechanism must be unlocked prior to the indexing mechanism moving the window to an indexed position.

20 Claims, 4 Drawing Sheets

GLASS INDEXING SYSTEM AND METHOD

TECHNICAL FIELD

The present invention relates to a system and method of indexing the window glass in the door of a vehicle.

BACKGROUND

Vehicles with convertible tops or hardtops are typically configured with doors having frameless window glass which seals directly to the convertible top or to the hardtop. The frameless window glass is moved into the seal, e.g., "tucked into" a sealing interface of the convertible top in a fully closed position to provide a seal to prevent wind noise, ingress of air, dust and rain, and to resist outward pressure of the window due to the pressure differential between the interior vehicle compartment and the outside of the vehicle at high speeds. In existing vehicles, a glass indexing system is provided for the purpose of indexing the glass to a partially lowered position to reduce the pressure build-up in the vehicle and the associated seal release or popping noise which may occur during door opening. However, the existing glass indexing systems are typically configured to initiate glass indexing in response to the door latch "ajar" switch being triggered by door movement, which also triggers the door ajar warning in the driver information display. The door ajar switch is typically actuated after the door is opened from the primary (fully closed), and when the door is between the primary and secondary (door partially opened) latch positions. Because the glass indexing is not initiated until after the door has been opened sufficiently to trigger the "door ajar" switch, the window glass is not indexed until after the door has been partially opened and the door opening movement has caused the non-indexed glass to push against, deform and interfere with the sealing interface. The interference between the non-indexed glass and the sealing interface results in increased door opening efforts, delay in door opening, wear and abrasion of the sealing interface, and seal release noise.

SUMMARY

A system and method to index the door window glass of a vehicle prior to opening the door from a closed position is provided. The system senses the initial movement of the unlatching lever in the door latch to trigger the indexing of the window glass, and therefore indexes the window glass to an indexed position which is non-interfering with the seal interface prior to door movement from a closed position. Because the system provides for indexing of the window glass prior to door movement, the indexed window glass opens to release the pressure differential and is clear of the sealing interface before the door moves from the closed position, reducing door opening efforts, eliminating seal release or popping noise, and eliminating sealing interface wear and abrasion by placing the window glass in a non-interfering position with the sealing interface, e.g., the window seal.

The system includes a door window glass configured to be selectively engageable with a window sealing interface of a vehicle. The window glass is engaged with the window sealing interface when the window glass is in a closed position, and is disengaged from the window sealing interface when the window glass is in an indexed position. The system further includes a door latch configured to be fastened such that the door remains in a closed position, and to be released such that the door is moveable from the closed position. The door includes an inside handle and an outside handle, each individually moveable to actuate the door latch. The door latch includes an unlatching lever selectively connectable to the inside handle and to the outside handle, such that moving one of the inside handle and the outside handle to actuate the door latch causes an initial change in the position of the unlatching lever prior to releasing the latch.

A sensor, which may be, for example, a switch, is configured to sense the initial change in the position of the unlatching lever in the door latch. The system includes a glass indexing mechanism configured to move the window glass from the closed position to the indexed position. The glass indexing mechanism is in operable communication with the sensor such that the glass indexing mechanism may move the window to the indexed position in response to the sensor sensing the initial change in the position of the unlatching lever, and prior to the latch being released, thereby moving the window to the indexed position prior to the door being moveable from a closed position.

The window indexing system further includes a door lock mechanism in operable communication with the door latch. In the non-limiting example provided herein, the system is configured such that the door lock mechanism must be unlocked prior to the glass indexing mechanism moving the window to an indexed position. The door lock mechanism may be in operable communication with the door latch via a door lock status switch or a lock linking lever.

The window indexing system, in the non-limiting example provided herein, includes a controller in operative communication with the sensor, the glass indexing mechanism, and the door lock mechanism. The controller is configured to activate the glass indexing mechanism in response to the sensor sensing an initial change in the position of the unlatching lever and after determining the door lock mechanism is unlocked.

The door may include an inside handle lever pivotable to selectively engage the unlatching lever, and an inside handle link operatively attached to the inside handle and to the inside handle lever. The inside handle link may be displaced by movement of the inside handle to selectively pivot the inside handle lever such that the inside handle lever engages the unlatching lever to cause the initial change in the position of the unlatching lever. The door may further include an outside handle lever pivotable to selectively engage the unlatching lever, and an outside handle link operatively attached to the outside handle and the outside handle lever. The outside handle link may be displaced by movement of the outside handle to selectively pivot the outside handle lever such that the outside handle lever engages the unlatching lever to cause the initial change in the position of the unlatching lever.

The vehicle may be configured with a convertible top or a hard top such that the window glass is frameless and the vehicle top at least partially defines the glass sealing interface. The window glass sealing interface may be configured as a window seal including an inner lip and an outer lip and defining a seal channel. The window glass in the closed position may be engaged with the channel and be in proximate contact with the inner lip and the outer lip. In the indexed position the window glass may be sufficiently disengaged from the channel such that the outer lip of the seal does not substantially interfere with the window glass when the door is moved from a closed position.

The above features and other features and advantages of the present invention are readily apparent from the following detailed description of the best modes for carrying out the invention when taken in connection with the accompanying drawings.

DETAILED DESCRIPTION

Referring to the drawings wherein like reference numbers represent like components throughout the several figures. The elements shown in FIGS. 1-7 are not to scale or proportion. Accordingly, the particular dimensions and applications provided in the drawings presented herein are not to be considered limiting.

Figure 1:
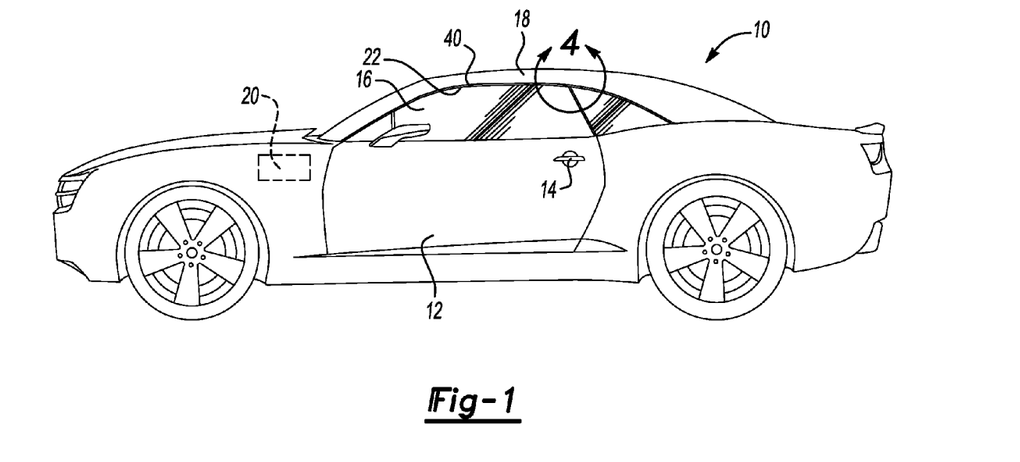
FIG. 1 is a schematic illustration of a side view of vehicle with a frameless door window.

FIG. 1 shows a vehicle 10 configured with a door 12 and a roof portion 18. In the non-limiting example provided herein, the roof portion 18 may be configured as one of a convertible top or a hard top, such that the door 12 has a frameless window glass 16 which seals directly to a sealing interface 40 defined by the roof portion 18. The sealing interface 40 may be configured as a seal which may extend along the perimeter of the roof portion 18 adjacent to a sealing edge 22 of the window glass 16. The seal 40 may further extend along a perimeter portion of the side window adjacent to the sealing edge 22 of the window glass 16. The frameless window glass 16 is moved into the seal 40, e.g., "tucked into" the sealing interface 40 of the roof portion 18 in a fully closed position to provide a seal to prevent wind noise, ingress of air, dust and rain, and to resist outward pressure of the window due to the pressure differential between the inside and outside of the vehicle at high speeds.

FIG. 1 shows the door 12 including an exterior or outside door handle 14, which is moveable to actuate a door latch to release the door 12 from a closed position, such that the door is moveable from the closed position to a fully opened position and to any intermediate position therebetween, for example, to a position where the door is slightly ajar or is partially opened. The vehicle 10 further includes a controller 20, which may be, by way of non-limiting example, a body control module or a door control module. The controller 20 may be configured to transmit and receive signals, to process information and provide commands to systems and components with which the controller 20 is operatively connected to or in communication with. The controller 20, as provided herein, may be operatively connected to or in communication with, a door latch, a window indexing mechanism, a door lock mechanism, and various sensors and switches associated therewith.

Figure 2:
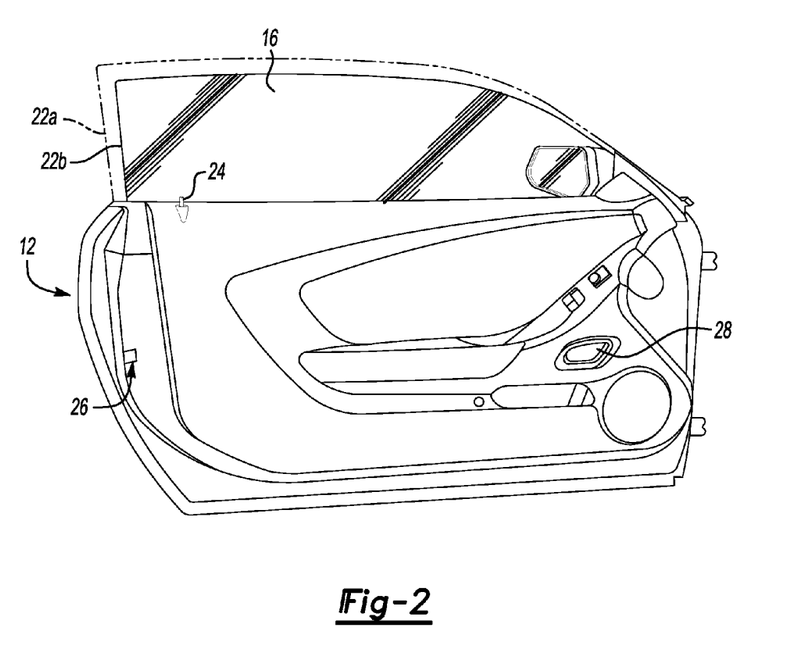
FIG. 2 is a schematic illustration of an side view of the interior surface of the door of the vehicle showing the frameless door window in an indexed position.

FIG. 2 shows a view of the door 12 from the interior of the vehicle 10. The door 12 includes an interior or inside door handle 28, which is moveable to actuate a door latch 26 to release the door 12 from a closed position, such that the door is moveable from the closed position to a fully opened position and to any intermediate position therebetween, for example, to a position where the door is slightly ajar or is partially opened. The door latch 26, also referred to as a door latch mechanism, is operatively attached to an interior portion of the door 12 (see FIG. 3) and is configured with an opening accessible from the exterior of the door 12, as shown FIG. 2, through which a striker or other engageable component is introduced to the latch 26 when the door 12 is in a closed position. In a typical configuration, the striker is fixedly attached to a door frame of the vehicle, and the latch 26 contains a selectively engageable component, such as a pawl, which is actuated by the door latch 26 to latch the door 12 to the door frame portion of the vehicle 10 in a closed position.

The door 12 further includes a door lock mechanism 24, which is configured to selectively lock the latch 26 such that the latch 26 is not independently disengageable, e.g., when the door lock mechanism 24 is engaged or in a locked condition, the latch 26 is prevented from being disengaged or unlatched. The door lock mechanism 24 may be engaged (locked) and disengaged (unlocked) by one or more methods. For example, the door lock mechanism 24 may be engaged or disengaged from the interior of the vehicle 10 using a door lock button or trigger which protrudes from an interior surface of the door 12 and/or using a door lock switch located on an interior surface of the door 12 such as the armrest; from the exterior of the vehicle 10 using keypad or a door key engaged with a key hole on the exterior surface of the door 12; and/or using a keyless actuator, such as a remote key fob. The door lock mechanism 24 may be in operative communication with the controller 20, such that the controller 20 may receive signals from and send signals to the door lock mechanism 24, including signals indicating the status (locked/unlocked) of the door lock mechanism 24, and signals commanding the door lock mechanism 24 to engage or disengage, e.g., lock or unlock, the door lock.

Figure 3:
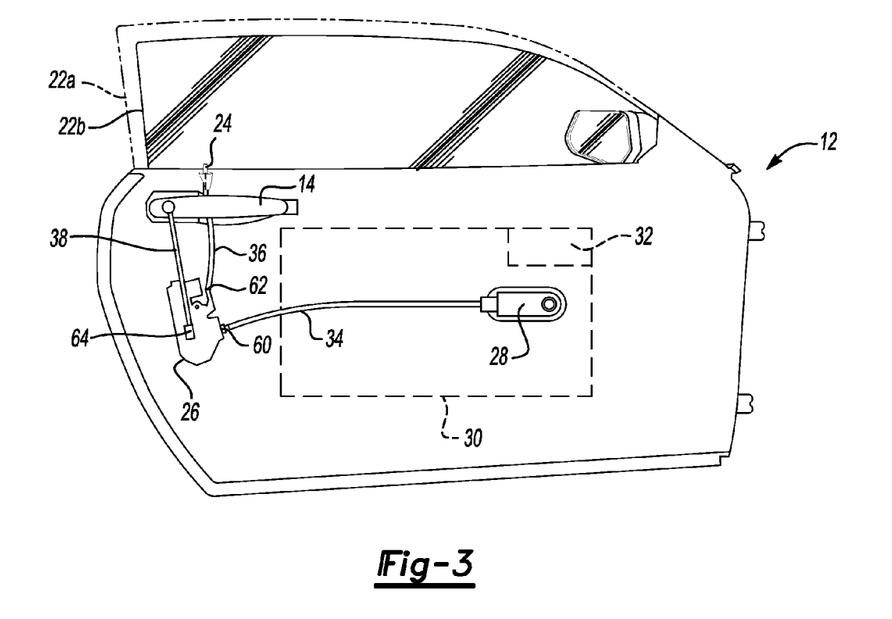
FIG. 3 is a schematic illustration of an side view of the inside of the door of the vehicle showing the frameless door window in an indexed position.

The window glass 16 is shown in FIG. 2 and in FIG. 3 in an indexed position, such that the sealing edge 22 is in an indexed position 22b, as compared with the sealed or closed position 22a of the sealing edge 22 when the glass 16 is in a closed position and substantially engaged with the seal 40. FIG. 3 shows a schematic view, in a non-limiting example, of window indexing system components located in the interior portion of the door 12. A window indexing mechanism 30 is shown, which includes an actuating means, such as a motor 32, for moving the glass 16 up and down in door 12 from a closed position (corresponding to the position shown by sealing edge 22a) to an indexed position (corresponding to the position shown by sealing edge 22b) to a fully opened position or any position therebetween. The window indexing mechanism 30, which may also be referred to as a glass indexing mechanism, a window regulator, or a window regulator assembly, may be of any configuration suitable to move the window glass 16 of door 12 in an up and down position, e.g., the window indexing mechanism 30 may be configured as one of an arm and sector, scissors-type, cable-type, flexible axis, rope wheel, double-lift, or rail and cable window regulator assembly. The actuating means 32, which may be referred to as an indexing motor or an indexing actuator, may be configured, for example, as a window lift motor and may be in operative communication with one or more switches, sensors or other electronic components and in operative communication with the controller 20.

Figure 4:
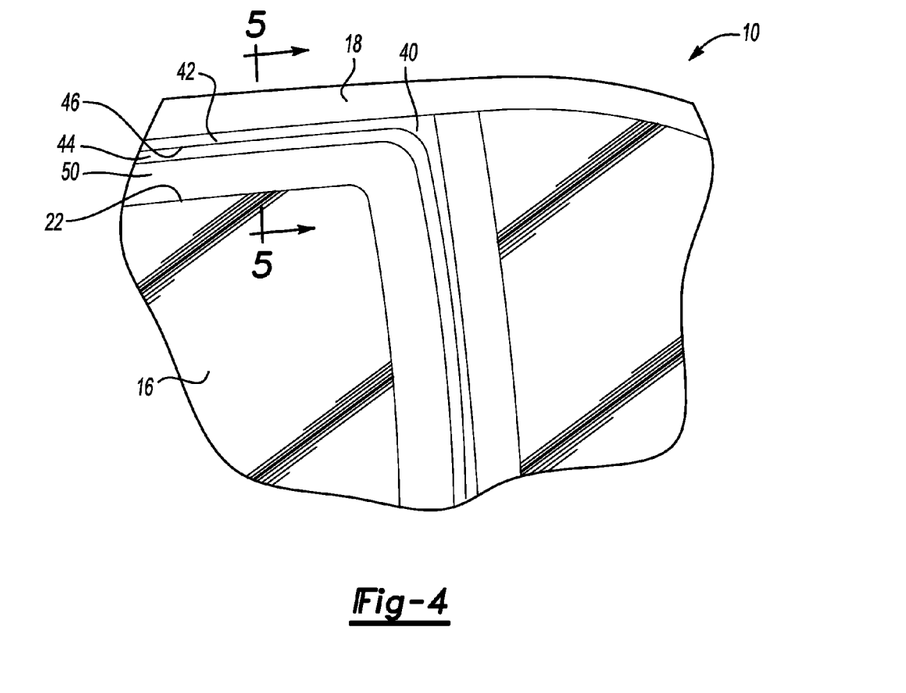
FIG. 4 is a partial schematic fragmentary illustration of the window glass and the window glass interface of section 4 of FIG. 1.
Figure 5A:
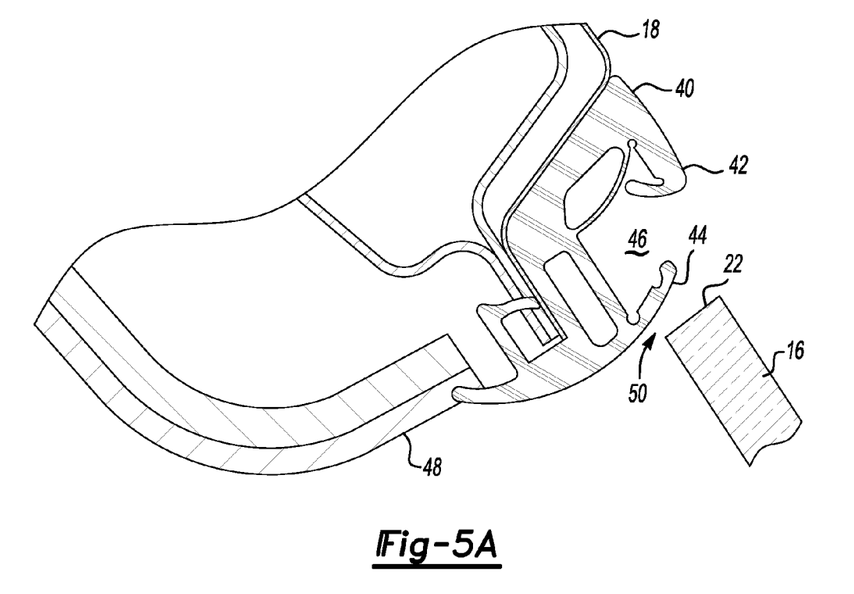
FIG. 5A is a partial schematic illustration of a cross sectional view of the window and the window glass interface of section 5-5 of FIG. 4, with the window glass in a closed position.
Figure 5B:
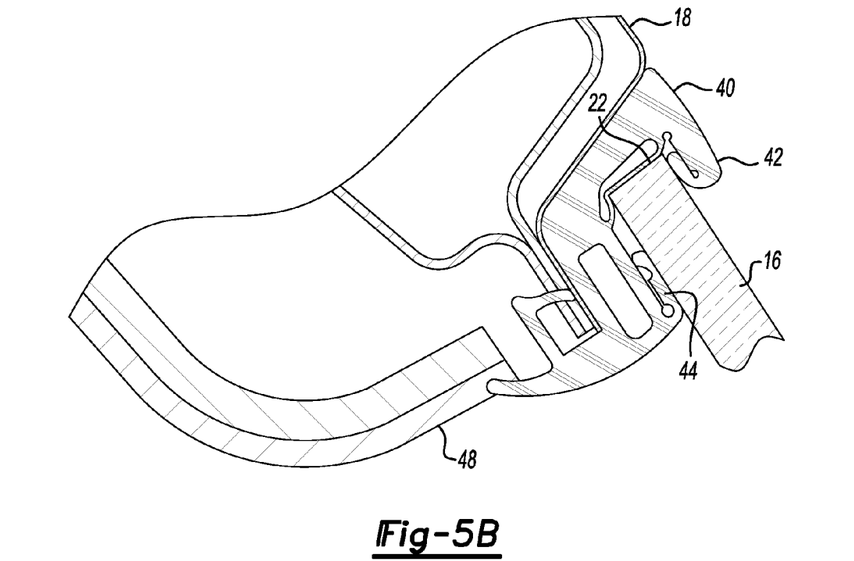
FIG. 5B is a partial schematic illustration of a cross sectional view of the window and the window glass interface of section 5-5 of FIG. 4, with the window glass in an indexed position.

FIGS. 4, 5A and 5B show the sealing edge 22 of window 16 and the configuration of seal 40 in additional detail. FIG. 4 shows a fragmentary schematic view of the portion of the vehicle 10 designated as area 4 in FIG. 1. The window glass 16 is shown in an indexed position such that the sealing edge 22 of glass 16 is moved away from the seal 40. The seal 40 is located along the perimeter of roof portion 18 and extends along the edge of the adjacent window segment such that it corresponds with the sealing edge 22 of the window 16. Seal 40 is configured to include an outside seal lip 42 and an inside seal lip 44. The outside seal lip 42 and the inside seal lip 44 define a seal channel 46 therebetween (see FIG. 5A) into which the sealing edge 22 of the glass 16 engages when the glass 16 is moved into a closed position, as shown in FIG. 5B.

FIG. 4 shows the window 16 in an indexed position, such that the sealing edge 22 of the glass 16 is disengaged from the seal 40 to define a clearance or gap 50 between the glass 16 and the seal 40. It is noted that the elements shown in FIG. 4 are not to proportion or scale, and specifically, the width of gap 50 corresponding to the window glass 16 in an indexed position, as shown in FIG. 4, is modified for clarity of illustration. In the indexed position, the gap 50 defined by the sealing edge 22 in the indexed position and the seal 40 would be, at a minimum, a sufficient gap such that the sealing edge 22 in the indexed position would not interfere with the outer lip 42 (see FIGS. 5A and 5B) when the door 12 is moved from a closed position. The gap 50 may be larger than the minimum or sufficient gap, to ensure a non-interfering condition considering variables such as variation in seal installation, door alignment, glass alignment, variation in the fastened position of the convertible or hardtop roof with the vehicle body, etc. and other factors, such as minimizing rain ingress when the window is indexed, etc., for the specific application and vehicle and/or door configuration. By way of non-limiting example, the gap 50 may typically be configured to provide a clearance of 10 mm to 25 mm between the sealing edge 22 and the closest adjacent surface of seal 40, along the length of sealing edge 22 when the window 16 is in an indexed position.

FIGS. 5A and 5B show a cross-sectional view taken through a section 5-5 of FIG. 4 with the window 16 in an indexed position in FIG. 5A and in a closed position in FIG. 5B. The seal 40 is shown in additional detail in FIG. 5A, and is operatively attached to the roof portion 18 and may be, by way of non-limiting example, operatively attached to a headliner or interior roof portion 48.

The outer lip 42 of the seal 40 may be configured to be selectively compressible, and/or to have an extension which may define a living hinge such that the outer lip 42 is configured to seal tightly against the sealing edge 22 of glass 16 when the glass 16 is in a closed position, in the non-limiting example shown in FIG. 5B. The inner lip 44 may be configured to be selectively compressible, and/or to have an extension which may define a living hinge such that the inner lip 44 is configured to seal tightly against the sealing edge 22 of glass 16 when the glass 16 is in a closed position, in the non-limiting example shown in FIG. 5B. In a fully closed position, the sealing edge 22 of glass 16 is tucked into the channel 46 and is sufficiently engaged with the seal 40 to provide a seal to prevent wind noise, ingress of air, dust and rain into the vehicle 10, and to sufficiently resist outward pressure of the window 16 against the engaged seal surfaces, for example, the surface of the outer lip 42, due to the pressure differential between the inside and outside of the vehicle at high speeds with sufficient force to sustain a seal between the window sealing edge 22 and the seal 40.

As discussed previously, and as shown in FIG. 5A, the glass 16 in an indexed position is lowered to define a gap or clearance 50 of sufficient width such that the sealing edge 22 does not interfere with the seal 40 when the door 12 is moved from a closed position. When the glass is indexed to the non-interfering position shown in FIG. 5A prior to movement of the door 12 from a closed position, such that the glass does not exert pressure against the seal 40 during the opening movement, the non-interfering glass edge 22 does not abrade, wear or distort the surfaces of seal 40, including the outer lip 42, which increases the durability and extends the useful life of the seal 40. Further, when the glass is indexed to the non-interfering position prior to movement of the door 12, the effort required to move the door 12 from a closed position is decreased by the effort that would have been required if the glass edge 22 was in an interfering position with the door seal 40. Therefore, by moving the glass 16 to an indexed position such that glass edge 22 is non-interfering with seal 40 prior to the movement of the door 12 from a closed position, using the window indexing system and method as described herein, the durability of seal 40 is improved, the opening efforts of door 12 are decreased, and noises such as the seal release or popping noise caused by glass to seal interference are eliminated.

Figure 6:
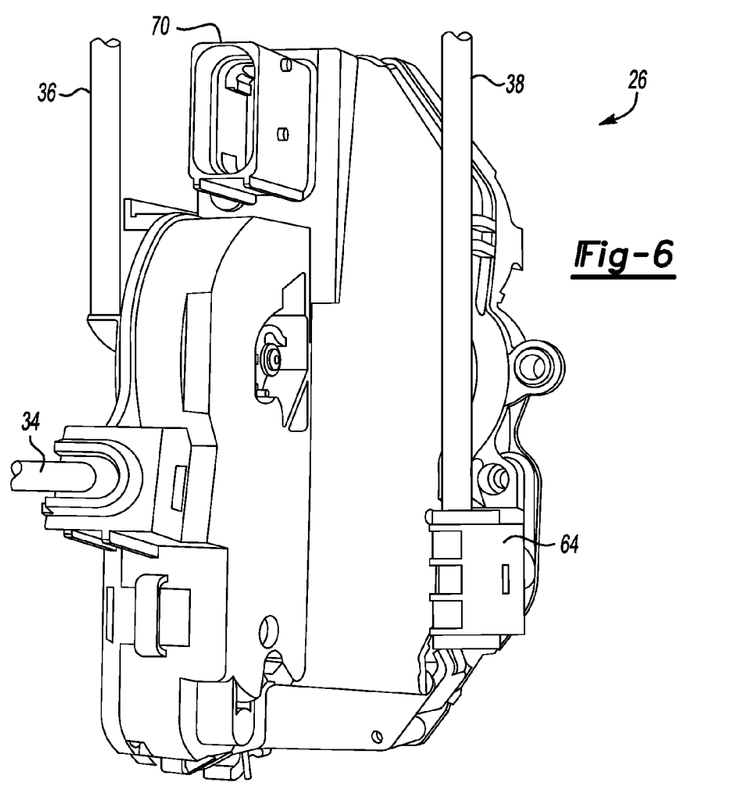
FIG. 6 is a schematic perspective illustration of a door latch.
Figure 7:
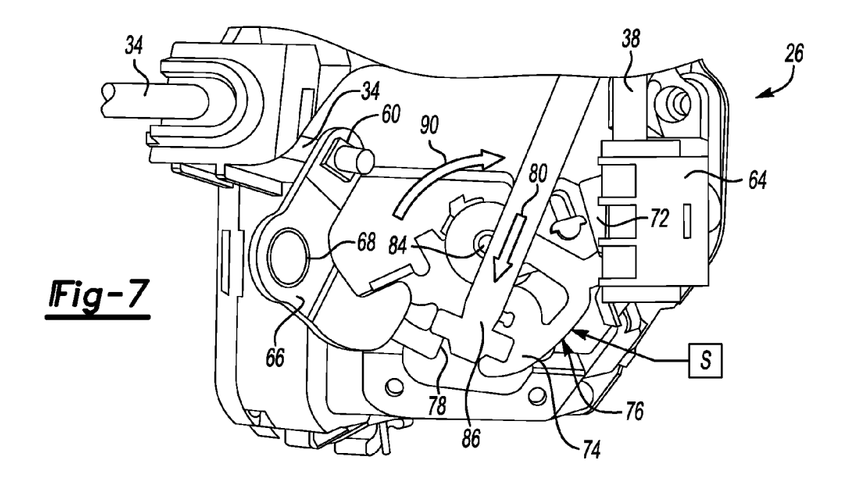
FIG. 7 is a schematic fragmentary perspective illustration of a portion of FIG. 6 cutaway to show an internal portion of the door latch of FIG. 6.

Referring to FIGS. 3, 6, and 7, where FIGS. 6 and 7 show the door latch 26 in additional detail, the latch 26 may be in operative communication with one or more of the controller 20, the locking mechanism 24, the glass indexing mechanism 30, and the indexing actuator 32, via, for example, a connector 70 shown in FIG. 6.

FIG. 3 shows the door latch 26 operatively connected to the door lock mechanism 24 by a link 36, which may be, for example, a cable or rod, which is operatively attached to latch 26 by a connector or clip 62. Link 36 is selectively connected to a locking lever 86, shown in FIG. 7. The locking lever 86 is operatively connected to the unlatching lever 74 at a notch 78 defined by the unlatching lever 74, such that the locking lever 86 is moveable with and by the rotation of the unlatching lever 74. The locking lever 86 is further configured to be moveable between a first unlocked position and a second locked position within the notch 78.

The locking lever 86 is shown in FIG. 7 in the first position in notch 78, also referred to as the unlocked position, which corresponds to the door lock mechanism 24 in an unlocked condition. The locking lever 86 is configured to selectively engage with a detent release lever (not shown) when the locking lever 86 is in the unlocked position and is moved by rotation of the unlatching lever 74 in the direction 90, to rotate the detent release lever and thereby unlatch the door 12.

When the door lock mechanism 24 is moved from an unlocked position to a locked position, the link 36 is displaced and selectively engages the locking lever 86 to displace the locking lever 86 in the notch 78 in a direction 80, to move the locking lever 86 from the unlocked position to a second, or locked, position. When the locking lever 86 is in the locked position, the locking lever 86 is positioned such that the locking lever 86 cannot engage the detent release lever when the locking lever 86 and the unlatching lever 74 are rotated, thereby preventing unlatching of the door 12 by the detent release lever.

FIG. 3 shows the door latch 26 operatively connected to and actuable by the outside door handle 14 via an outside handle link 38, which may be, by way of non-limiting example, a rod. Rod 38 is operatively attached to latch 26 by a connector or clip 64. Clip 64, as shown in FIG. 7, is connected to an outside handle lever 72, which is selectively engageable with an unlatching lever 74, also shown in FIG. 7. When the outside door handle 14 is moved to actuate, or unlatch, the door 12, the rod 38 is displaced by movement of the outside handle 14 and rotates the outside handle lever 72 in a direction 90 around a pivot 84 to engage with the unlatching lever 74 and to initiate the movement, e.g., rotation, of the unlatching lever 74 in a direction 90 around the pivot 84. The rotation of the unlatching lever 74 in the direction 90 when the locking lever 86 is in an unlocked position causes the unlatching of the door 12 from the vehicle 10, for example, by causing the movement of the detent release lever to release the door latch 26 such that the door 12 in an unlatched condition becomes moveable (openable) from a closed position.

In the example shown in FIG. 7, the outside handle lever 72 and the unlatching lever 74 are rotated around a common pivot 84, however this example should be considered non-limiting and other configurations of the levers 72 and 74 may be possible. As previously discussed, the locking lever 86 must be in an unlocked position in notch 78 for rotation of the unlatching lever 74 to unlatch and release the door 12 such that door 12 is moveable from a closed position, e.g., the locking lever 86 must be in an unlocked position to operatively engage the detent release lever when unlatching lever 74 is rotated in the direction 90.

The door latch 26 is operatively connected to and actuable by the inside door handle 28 via an inside handle link 34, which may be, in the non-limiting example described, a cable. Cable 34 is operatively attached to latch 26 by a connector or clip 60. Clip 60, as shown in FIG. 7, operatively connects to the inside handle cable 34 to an inside handle lever 66, which is selectively engageable with the unlatching lever 74. When the inside door handle 28 is moved to actuate, or unlatch, the door 12, the cable 34 is displaced by movement of the inside handle 28 and rotates the inside handle lever 66 around a pivot 68 to engage with the unlatching lever 74, initiating the movement, e.g., rotation, of the unlatching lever 74 in the direction 90 around the pivot 84. As discussed previously, the rotation of the unlatching lever 74 in the direction 90 when the locking lever 86 is in an unlocked position causes the unlatching of the door 12 from the vehicle 10, for example, by engaging the locking lever 86 to rotate the detent release lever to cause release of the door latch 26 such that the door 12 in an unlatched condition becomes moveable (openable) from a closed position. As previously discussed, the locking lever 86 must be in an unlocked position in notch 78 for rotation of the unlatching lever 74 to unlatch and release the door 12 such that door 12 is moveable from a closed position, e.g., the locking lever 86 must be in an unlocked position with respect to the unlatching lever 74 to operatively engage the detent release lever when unlatching lever 74 is rotated in the direction 90 to unlatch and release the door 12 such that door 12 is moveable from a closed position.

FIG. 7 shows a sensor S configured to detect the initial movement or change in position of the unlatching lever 74 when the unlatching lever 74 is actuated by movement of either of the inside handle 28 or outside handle 14 to initiate unlatching of the door 12. The sensor S may be in operative communication with one or more of the controller 20, the locking mechanism 24, the glass indexing mechanism 30, and the indexing actuator 32, such that the sensor S may be configured to transmit to and receive signals from one or more of these elements.

The sensor S may be located, by way of non-limiting example, in proximate contact with a surface 76 of the unlatching lever 74, such that the sensor S may detect the initial change in position of the unlatching lever 74 as the lever 74 begins to rotate about the pivot 84 in response to engagement by either of the inside door lever 66 and the outside door lever 72. In a non-limiting example, the sensor S may be configured as a switch, which may be, for example, a microswitch.

The "initial movement" or "initial change in position" of the unlatching lever 74 as the lever 74 begins to rotate about the pivot 84 in response to engagement by either of the inside door lever 66 and the outside door lever 72, as used herein, relates to the change in position of the unlatching lever 74 which occurs prior to the unlatching lever 74 rotating sufficiently to unlatch the latch 26, e.g., to release door 12 from its latched or closed position. By detecting the "initial change in position" of the unlatching lever 74, the sensor S may signal other elements in the vehicle system, for example, the controller 20, of the initial change in position of the unlatching lever 74, and thereby signal the pending unlatching and movement of the door 12, prior to the occurrence of any movement of the door 12 from a closed position. The controller 20, upon receipt of a signal from sensor S that an initial change in the position of the unlatching lever 74 has occurred, can command the indexing actuator 32 and the glass indexing mechanism 30 to move the glass 16 to an indexed position (see the indexed position 22b of glass 16 in FIG. 2 and FIG. 5A), such that the glass 16 is moved to the indexed position prior to the unlatching lever 74 rotating sufficiently to unlatch the latch 26 and release the door 12 from a closed position. As such, the glass 16 would be moved in the indexed position to define a gap 50 prior to any movement of door 12 from a closed position, and the sealing edge 22 would be in a non-interfering position with respect to the seal 40 when the door 12 is opened.

Other configurations of the system are possible. For example, the controller 20 may be configured to be in operative communication with the door lock mechanism 24 such that the controller 20 may determine, after receiving a signal indicating an initial change in position of the unlatching lever 74 and prior to commanding the glass indexing mechanism 30 to move the glass 16 to an indexed position, whether the door lock mechanism 24 is in a locked or unlocked condition. If the locking mechanism 24 is in a locked condition, then the controller 20 would command the glass indexing mechanism 30 to maintain the glass 16 in a closed position, or alternatively, would not send a signal to move the glass 16 to an indexed position.

The window indexing system may be configured to verify that the locking mechanism 24 is unlocked prior to moving the glass 16 to an indexed position for various reasons. For example, glass indexing may be prohibited to maintain a secure window seal when moving the outside handle 14 of a locked vehicle 10, where movement of the outside handle 14, even though the vehicle is locked, may be sufficient to initiate movement of the unlatching lever 74 detectable by the sensor S. As another example, glass indexing may be prohibited to prevent inadvertent indexing of the window while the vehicle is locked, when inadvertent movement of the inside handle 28 is sufficient to initiate movement of the unlatching lever 74 detectable by the sensor S, when the vehicle is in motion or otherwise.

By way of another non-limiting example configuration, the sensor S may be in operative communication with the locking mechanism 24 and with the indexing actuator 32, such that when the sensor S detects an initial movement of the unlatching lever 32, the sensor S communicates with the locking mechanism 24 to determine whether the locking mechanism 24 is in an unlocked position prior to signaling the indexing actuator 32 to move the glass 16 to the indexed position.

In another non-limiting example, the inside door handle 28 and door latch 26 may be configured such that a first handle pull or beginning of the handle pull actuates unlocking of the door lock mechanism 24, and a second handle pull, or the secondary movement of the handle unlatches the door 12. In this instance, the sensor S may be configured to sense the movement of the unlatching lever 74 at the point where the second handle pull is initiated, and prior to the unlatching of the latch 26.

In another non-limiting configuration, the door 12 may be unlatched in a sequence whereby the beginning rotation of the unlatching lever 74 releases a primary latch and the continued rotation of the unlatching lever in the direction 90 releases a secondary latch. The door 12 may be sufficiently moveable after release of the primary latch such that outward movement of the door 12, toward an open position, may cause the window glass 16, if in a closed position 22a to interfere with the seal 40 such that door opening efforts are increased. In this instance, the sensor S may be configured to sense the movement of the unlatching lever 74 at the point prior to release of the primary latch, and therefore prior to the door 12 being moveable from a closed position, and prior to the unlatching of the secondary latch.

The system may be alternatively configured with one or more sensors S positioned in one or more locations other than the unlatching lever 74, whereby the one or more sensors S are configured to sense the initiation of a door unlatching movement prior to the unlatching of the door 12, such that the sensor S can signal and cause the movement of the window glass 16 prior to the release of the door 12 from a closed position. For example, a first sensor S may be configured in operative communication with the inside handle cable 34, and a second sensor S may be configured in operative communication with the outside handle rod 38, such that displacement of either of the cable 34 or the rod 38 sufficient to initiate unlatching of the latch 26 may be detected by the respective sensor S, and the respective sensor S can signal the system to move the window glass 16 to an indexed position prior to release of the door latch 26.

A method for indexing the window glass 16 in the door 12 of the vehicle 10 prior to releasing the door 12 such that the door 12 is moveable from a closed position is provided. The method includes moving, in a first step, either the inside handle 28 or the outside handle 14 of the door 12 to initiate the release of the door latch 26, where the door latch 26 includes an unlatching lever 74 and a sensor S configured to sense the position of the unlatching lever 74. The unlatching lever 74 is selectively connectable to the inside handle 28 and to the outside handle 14 such that the unlatching lever 74 is rotatable by movement of one of the inside handle 28 and the outside handle 14.

Moving the inside handle 28 to initiate the release of the door latch 26 may further include moving the inside handle 28 to displace an inside handle link 34 operatively attached to the inside handle 28 and an inside handle lever 66 configured to selectively engage the unlatching lever 74, to pivot the inside handle lever 66 such that the inside handle lever 66 engages the unlatching lever 74 to cause the initial change in the position of the unlatching lever 74. Moving the outside handle 14 to initiate the release of the door latch 26 may further include moving the outside handle 14 to displace an outside handle link 38 operatively attached to the outside handle 14 and an outside handle lever 72 configured to selectively engage the unlatching lever 74, to pivot the outside handle lever 72 such that the outside handle lever 72 engages the unlatching lever 74 to cause the initial change in the position of the unlatching lever 74.

In a next step, the release of the door latch 26 is initiated by initiating an initial change in the position of the unlatching lever 74 prior to rotating the unlatching lever 74 sufficiently to release the latch 26 such that the door 12 is moveable from a closed position, and the initial change in the position of the unlatching lever 74 is sensed using the sensor S, wherein the sensor S is in operable communication with the glass indexing mechanism 30. The glass indexing mechanism 30 is activated in response to sensing the initial change in the position of the unlatching lever 74, and the window glass 16 is indexed to an indexed position (see FIG. 5A and the position 22b of the sealing edge of glass 16 in FIGS. 2 and 3) using the glass indexing mechanism 30, such that the window glass 16 in the indexed position is disengaged from the glass sealing interface 40 of the vehicle 10, and is indexed to the indexed position prior to releasing the latch 26 sufficiently such that the door 12 is moveable from the closed position.

The method may further include determining the locking position of the door lock mechanism 24 in operable communication with the door latch 26 prior to indexing the window glass 16 to an indexed position, and indexing the window glass 16 to an indexed position only when the door lock mechanism 24 is in an unlocked position.

The method may include generating a signal from the sensor S when the sensor S senses the initial change in the position of the unlatching lever 74, receiving the signal at a controller 20, wherein the controller 20 is in communication with the sensor S, the door lock mechanism 24 and the glass indexing mechanism 30 and configured to activate the glass indexing mechanism 30 in response to the signal. The method may further include detecting the locking position of the door lock mechanism 24 using the controller 20 and activating the glass indexing mechanism 30 to index the window glass 16 when the door lock mechanism 24 is in an unlocked position, using the controller 20. The locking position of the door lock mechanism 24 may be determined by communicating with a door lock status switch in operative communication with the door lock mechanism 24, and/or determining the position of a lock linking lever 86 in operative communication with the door latch 26.

While the best modes for carrying out the invention have been described in detail, those familiar with the art to which this invention relates will recognize various alternative designs and embodiments for practicing the invention within the scope of the appended claims.

The invention claimed is:

1. A window indexing system for a vehicle door, the system comprising:
   a window glass configured to be selectively engageable with a window sealing interface of a vehicle, wherein
     the window glass is engaged with the window sealing interface when the window glass is in a closed position, and
     the window glass is disengaged from the window sealing interface when the window glass is in an indexed position;
   a door latch configured to be fastened such that the door remains in a closed position, and configured to be released such that the door is moveable from the closed position;
   an inside handle moveable to actuate the door latch;
   an outside handle moveable to actuate the door latch;
   the door latch including:
     an unlatching lever selectively connectable to the inside handle and to the outside handle, such that moving one of the inside handle and the outside handle to actuate the door latch causes an initial change in the position of the unlatching lever prior to releasing the door latch;
     a sensor configured to sense the initial change in the position of the unlatching lever;
   a glass indexing mechanism configured to move the window glass from the closed position to the indexed position, the glass indexing mechanism in operable communication with the sensor; and wherein the glass indexing mechanism moves the window to the indexed position in response to the sensor sensing the initial change in the position of the unlatching lever, and prior to the latch being released.

2. The window indexing system of claim 1, further comprising:

a door lock mechanism in operable communication with the door latch, wherein the door lock mechanism is unlocked prior to the glass indexing mechanism moving the window to an indexed position.

3. The window indexing system of claim 2, wherein the door lock mechanism is in operable communication with the door latch via one of a door lock status switch and a lock linking lever.

4. The window indexing system of claim 2, further comprising:

a controller in operative communication with the sensor, the glass indexing mechanism, and the door lock mechanism;

wherein the controller is configured to activate the glass indexing mechanism in response to the sensor sensing an initial change in the position of the unlatching lever and after determining the door lock mechanism is unlocked.

5. The window indexing system of claim 1, wherein the vehicle is configured with one of a convertible top and a hard top; and wherein the one of a convertible top and a hard top at least partially defines the window sealing interface.

6. The window indexing system of claim 1, wherein the sensor is configured as a switch.

7. The window indexing system of claim 1, further comprising:

an inside handle lever pivotable to selectively engage the unlatching lever;

an inside handle link operatively attached to the inside handle and to the inside handle lever and displaceable by movement of the inside handle to selectively pivot the inside handle lever such that the inside handle lever engages the unlatching lever to cause the initial change in the position of the unlatching lever;

an outside handle lever pivotable to selectively engage the unlatching lever;

an outside handle link operatively attached to the outside handle and the outside handle lever and displaceable by movement of the outside handle to selectively pivot the outside handle lever such that the outside handle lever engages the unlatching lever to cause the initial change in the position of the unlatching lever.

8. A method for indexing a window glass in a door of a vehicle prior to opening the door from a closed position, the method comprising:

moving one of an inside handle and an outside handle of the door to initiate the release of a door latch, the door latch including an unlatching lever and a sensor configured to sense the position of the unlatching lever;

wherein the unlatching lever is selectively connectable to the inside handle and to the outside handle such that the unlatching lever is rotatable by movement of one of the inside handle and the outside handle;

initiating the release of the door latch by initiating an initial change in the position of the unlatching lever prior to rotating the unlatching lever sufficiently to release the latch such that the door is moveable from a closed position;

sensing the initial change in the position of the unlatching lever using the sensor, wherein the sensor is in operable communication with a glass indexing mechanism;

activating the glass indexing mechanism in response to sensing the initial change in the position of the unlatching lever;

indexing the window glass to an indexed position using the glass indexing mechanism; and wherein the window glass in the indexed position is disengaged from a glass sealing interface defined by the vehicle, and is indexed to the indexed position prior to releasing the latch sufficiently such that the door is moveable from the closed position.

9. The method of claim 8, further comprising:

determining the locking position of a door lock mechanism in operable communication with the door latch prior to indexing the window glass to an indexed position; and indexing the window glass to an indexed position only when the door lock mechanism is in an unlocked position.

10. The method of claim 9, further comprising:

generating a signal from the sensor when the sensor senses the initial change in the position of the unlatching lever;

receiving the signal at a controller, wherein the controller is in communication with the sensor, the door lock mechanism and the glass indexing mechanism and configured to activate the glass indexing mechanism in response to the signal;

detecting the locking position of the door lock mechanism using the controller;

activating the glass indexing mechanism to index the window glass when the door lock mechanism is in an unlocked position, using the controller.

11. The method of claim 9, wherein determining the locking position of the door lock mechanism further comprises one of:

communicating with a door lock status switch in operative communication with the door lock mechanism; and determining the position of a lock linking lever in operative communication with the door latch.

12. The method of claim 9, wherein moving one of an inside handle and an outside handle to initiate the release of a door latch and initiating the release of the door latch by initiating an initial change in the position of the unlatching lever further comprises one of:

moving the inside handle to displace an inside handle link operatively attached to the inside handle and an inside handle lever configured to selectively engage the unlatching lever, to pivot the inside handle lever such that the inside handle lever engages the unlatching lever to cause the initial change in the position of the unlatching lever; and moving the outside handle to displace an outside handle link operatively attached to the outside handle and an outside handle lever configured to selectively engage the unlatching lever, to pivot the outside handle lever such that the outside handle lever engages the unlatching lever to cause the initial change in the position of the unlatching lever.

13. A vehicle comprising:

a vehicle portion defining a glass sealing interface;

a door including:

a window glass configured to be selectively engageable with the glass sealing interface, wherein the window glass is engaged with the glass sealing interface when the window glass is in a closed position, and the window glass is disengaged from the glass sealing interface when the window glass is in an indexed position;

an inside handle moveable to actuate a door latch;

an outside handle moveable to actuate the door latch;

wherein the door latch is configured to be fastened such that the door remains in a closed position, and configured to be released such that the door is moveable from the closed position, the door latch including:

an unlatching lever actuated by either of the inside handle and the outside handle, wherein actuating the unlatching lever causes an initial change in the position of the unlatching lever prior to releasing the latch such that the door is moveable;

a sensor configured to sense the initial change in the position of the unlatching lever;

a glass indexing mechanism in operable communication with the sensor; and wherein the glass indexing mechanism moves the window glass to an indexed position in response to the position sensor sensing the initial change in the position of the unlatching lever and prior to the latch releasing sufficiently such that the door is moveable from a closed position.

14. The vehicle of claim 13, further comprising:

a door lock mechanism in operable communication with the door latch, wherein the door lock mechanism is unlocked prior to the glass indexing mechanism moving the window to an indexed position.

15. The vehicle of claim 14, wherein the door lock mechanism is in operable communication with the door latch via one of a door lock status switch and a locking link lever.

16. The vehicle of claim 14, further comprising:

a controller in operative communication with the position sensor, the glass indexing mechanism, and the door lock mechanism;

wherein the controller is configured to activate the glass indexing mechanism in response to the position sensor sensing an initial change in the position of the unlatching lever, and after determining the door lock mechanism is unlocked.

17. The vehicle of claim 13, wherein the position sensor is configured as a switch.

18. The vehicle of claim 13, wherein the vehicle is configured with one of a convertible top and a hard top such that the window glass is frameless; and wherein the one of the convertible top and the hard top at least partially defines the glass sealing interface.

19. The vehicle of claim 13, wherein the glass sealing interface is configured as a window seal including an inner lip and an outer lip and defining a seal channel;

wherein the window glass in the closed position is engaged with the channel and is in proximate contact with the inner lip and the outer lip; and wherein the window glass in the indexed position is sufficiently disengaged from the channel such that the outer lip of the seal does not substantially interfere with the window glass when the door is moved from a closed position.

20. The vehicle of claim 13, further comprising:

an inside handle lever pivotable to selectively engage the unlatching lever;

an inside handle link operatively attached to the inside handle and to the inside handle lever and displaceable by movement of the inside handle to selectively pivot the inside handle lever such that the inside handle lever engages the unlatching lever to cause the initial change in the position of the unlatching lever;

an outside handle lever pivotable to selectively engage the unlatching lever;

an outside handle link operatively attached to the outside handle and the outside handle lever and displaceable by movement of the outside handle to selectively pivot the outside handle lever such that the outside handle lever engages the unlatching lever to cause the initial change in the position of the unlatching lever.

\* \* \* \* \*